(12) United States Patent
Muratori et al.

(10) Patent No.: US 10,889,077 B2
(45) Date of Patent: Jan. 12, 2021

(54) DIE FOR CASTING JUNCTIONS OF A COATING OF A PIPELINE

(71) Applicant: SAIPEM S.p.A., San Donato Milanese (IT)

(72) Inventors: Valerio Muratori, San Donato Milanese (IT); Francesco Simone, San Donato Milanese (IT)

(73) Assignee: SAIPEM S.p.A., San Donato Milanese (IT)

( * ) Notice: Subject to any disclaimer, the term of this patent is extended or adjusted under 35 U.S.C. 154(b) by 55 days.

(21) Appl. No.: 16/462,439

(22) PCT Filed: Nov. 23, 2017

(86) PCT No.: PCT/IB2017/057372
§ 371 (c)(1),
(2) Date: May 20, 2019

(87) PCT Pub. No.: WO2018/096489
PCT Pub. Date: May 31, 2018

(65) Prior Publication Data
US 2019/0322061 A1 Oct. 24, 2019

(30) Foreign Application Priority Data

Nov. 23, 2016 (IT) .................. 102016000118767

(51) Int. Cl.
| | |
|---|---|
| *B29C 70/84* | (2006.01) |
| *B29C 70/74* | (2006.01) |
| *B29C 45/14* | (2006.01) |
| *B29C 45/26* | (2006.01) |
| *B29C 45/34* | (2006.01) |
| *F16L 58/18* | (2006.01) |
| *B29C 70/76* | (2006.01) |

(52) U.S. Cl.
CPC ...... *B29C 70/845* (2013.01); *B29C 45/14598* (2013.01); *B29C 45/14622* (2013.01);
(Continued)

(58) Field of Classification Search
CPC ... B29C 70/845; B29C 70/766; B29C 70/742; B29C 45/14418; B29C 45/14622;
(Continued)

(56) References Cited

U.S. PATENT DOCUMENTS

| | | | | |
|---|---|---|---|---|
| 3,989,281 A | * | 11/1976 | Wilde, Jr. | ............ F16L 13/0272 285/45 |
| 5,306,021 A | * | 4/1994 | Morvant | .............. F16J 15/3232 277/530 |

(Continued)

FOREIGN PATENT DOCUMENTS

GB 2520769 A 6/2015

OTHER PUBLICATIONS

Translation of KR 10-0607599 B1 dated Jun. 2004 with figures obtained from the KIPO website. (Year: 2004).*

(Continued)

*Primary Examiner* — Robert B Davis
(74) *Attorney, Agent, or Firm* — Neal, Gerber & Eisenberg LLP

(57) ABSTRACT

A die for casting junctions of a coating of a pipeline is configured to be coupled to the pipeline to form an annular shaped closed compartment about a tubular joint portion comprising a tubular wall, which extends about a designated axis; a plurality of centering devices configured to align the axis of the tubular wall with a longitudinal axis of the pipeline; two annular walls arranged respectively at the opposite ends of the tubular wall; and two pluralities of vent openings arranged along the tubular wall respectively at each of the annular walls; and at least one feeding port configured to supply polymer material into the closed compartment.

23 Claims, 4 Drawing Sheets

(52) U.S. Cl.
CPC .......... *B29C 45/345* (2013.01); *B29C 70/766* (2013.01); *F16L 58/181* (2013.01); *B29C 2045/14606* (2013.01)

(58) Field of Classification Search
CPC .... B29C 2045/14606; B29C 45/14598; B29C 45/261; B29C 45/345; F16L 58/181
See application file for complete search history.

(56) References Cited

U.S. PATENT DOCUMENTS

| | | | |
|---|---|---|---|
| 5,753,272 A * | 5/1998 | Kashiwagi | B29O 33/42 174/174 |
| 6,843,950 B1 | 1/2005 | Mally et al. | |
| 7,673,654 B2 * | 3/2010 | Rice | F16L 55/175 138/99 |
| 2013/0170913 A1 | 7/2013 | Hoffmann | |
| 2014/0311606 A1 * | 10/2014 | Beris | F16L 58/181 138/97 |

OTHER PUBLICATIONS

Notification Concerning Submission, Obtention or Transmittal of Priority Document for International Application No. PCT/IB2017/057372 dated Jan. 18, 2018.

International Search Report and Written Opinion for International Application No. PCT/IB2017/057372 dated Feb. 8, 2018.

\* cited by examiner

DIE FOR CASTING JUNCTIONS OF A COATING OF A PIPELINE

PRIORITY CLAIM

This application is a national stage application of PCT/IB2017/057372, filed on Nov. 23, 2017, which claims the benefit of and priority to Italian Patent Application No. 102016000118767, filed on Nov. 23, 2016, the entire contents of which are each incorporated by reference herein.

TECHNICAL FIELD

The present disclosure relates to a die for casting junctions of a coating of a pipeline.

In particular, the present disclosure relates to a die configured to cast junctions of a coating of a pipeline configured to transport hydrocarbons, however, without loss of generality.

BACKGROUND

Pipelines used for carrying hydrocarbons are made up of sections of tube joined to one another to cover overall lengths in the region of hundreds of kilometers. The sections of tube present a uniform length, generally 12 meters, and relatively elevated diameters, from 0.2 to 1.5 meters. Each section of tube comprises a steel cylinder; a first coating of single layer and/or multilayer polymer material, which serves to protect the steel pipe; and possibly a second coating in gunite or cement, whose function is to weigh down the pipeline. Sometimes, in a number of applications, the second coating is not necessary and is not provided for the sections of pipe and underwater pipelines.

The free opposite ends of each section of pipe are without the first and second coating to allow the steel cylinders to be welded to one another. The end portion without coating is called "Cutback". The sections of pipe are joined to one another, both in ground facilities to form sections of pipe of a multiple length of the uniform length, and in pipelay vessels, wherein the sections of pipe, of a uniform length or of a multiple length, are joined to sections of pipe, which are already joined to other sections of pipe to form part of the pipeline.

The operation of joining the sections of pipe includes welding the steel cylinders, generally with several welding treatments, and touching up the first coating and the second coating, where present. After making a welding ring between two steel cylinders, a tubular joint portion without the first and second coating extends over the welding. The tubular joint portion is substantially defined by the free ends of the sections of pipe, it extends axially between two end edges of the first coating and must be covered by a protective coating, which adheres to the tubular joint portion and to the edges of the pre-existing coatings.

The application of the protective coating to the tubular joint portion and the preliminary preparations are known in the practice as "Field Joint Coating".

The application of the protective coating to the tubular joint portion includes sandblasting, heating the tubular point portion, for example, by induction or infrared, until a temperature of 250° C.; spraying powdered epoxy (FBE Fusion Bonded Epoxy) onto the tubular joint portion, which, when it comes into contact with the tubular joint portion, forms a first, relatively fine layer called a "primer"; spraying, onto the tubular joint portion, over the first layer, a modified co-polymer, acting as an adhesive, which, when it comes into contact with the first layer, forms a second, relatively fine layer; and applying a third layer, generally called a "Top Coat". Subsequently, any second coating is touched up. Alternatively, it is possible to apply only the "Top Coat" directly onto the previously heated surface. However, this technique requires special polymer materials, which have only been developed recently and are still relatively expensive.

The welding operations, the non-destructive tests for checking the welding and the operations of touching up the first and second coating are carried out in workstations, which are uniformly distributed along an advancing path of the sections of pipe (or the pipeline being made when the sections of pipe are joined to the latter). Consequently, the sections of pipe are advanced in step with an idle time in each workstation determined by the operation, which takes the longest time.

The methods currently used for applying the protective coating are the following:

Heating, wrapping and compressing a plurality of thin sheets of polymer material about the tubular joint portion. This method of application of the third layer is known as "cigarette wrap", Heating, double helix wrapping and compressing a strip of polymer material about the tubular joint portion. This method of application is known as "spiral wrapping", Applying a polymer with a hot spray gun to melt the polymer. This method of application of the third layer is known as "flame spraying", Assembling a die about the tubular joint portion and injecting the polymer about the annular portion, Arranging a band of polymer material having a heat-shrinkable outer protective layer heating the band to shrink the band.

The choice of the type of technique for achieving the so-called "Top Coat" substantially depends on the thickness of the "Top Coat", which depends, in turn, on the design needs, such as, for example, the level of thermal insulation, which is to be obtained given the marine weather conditions, and the temperature at which the hydrocarbon conveyed in the pipeline is to be kept. The technique, which includes injecting a polymer material into a die assembled about the tubular joint portion is the technique, which allows the "Top Coat" to be achieved in a relatively reasonable length of time, also when the thickness of the "Top Coat" is relatively extremely elevated, and in the order of 400/800 mm. Taking into consideration the maximum diameter of the pipeline and the length of the tubular joint portion the volume comprised between the tubular joint portion and the die can reach up to 450 dm3.

The filling of the die is rendered particularly difficult by the considerable density of the injected polymer material, which requires a sealed and rigid die. U.S. Pat. No. 6,843,950 B1 and U.S. Published Patent Application No. 2013/0170913 show dies for casting junctions of the coating of a pipeline, which highlight the problem of injecting a polymer material with a considerable density, and the problem of avoiding the formation of air bubbles in the "Top Coat". Even though air has excellent thermal insulation properties, it is not possible to control the position and size of the air bubbles trapped in the die, with the result that air bubbles are often concentrated in certain areas and have the effect of weakening the protective coating to such an extent that it does not pass the quality controls, U.S. Pat. No. 6,843,950 B1 and U.S. Published Patent Application No. 2013/0170913 describe respective dies for overcoming the problem presented above.

In greater detail, U.S. Pat. No. 6,843,950 B1 recommends measuring the die so that when it is closed on the pipeline, it forms annular interstices at the opposite ends of the die, allowing the air to go out and concentrating the cooling of the die at such interstices so as to cool the thermoplastic material immediately when the thermoplastic material reaches such interstices, thus preventing the thermoplastic material from coming out of the die.

The problem of filling the die is discussed in U.S. Published Patent Application No. 2013/0170913, which describes a device with the following characteristics: a die sealed with stiffening rings, to improve the seal of the toppings; a plurality of injection mouths for injecting the polymer material into different areas of the die; means for cooling the front of the already injected polymer material; and an air outlet vent arranged at the end opposite to that of the flow direction of the injected polymer material.

Both of the dies described in the above identified documents are relatively particularly complex and/or require relatively complex controls when implemented.

SUMMARY it is the object of the present disclosure to manufacture a die for junctions, which is able to overcome certain of the drawbacks of certain of the prior art.

According to the present disclosure, a die is manufactured configured to cast junctions of a coating along a pipeline, the die being configured to be coupled to the pipeline to form an annular closed compartment about a tubular joint portion and comprising a tubular wall, which extends about a designated axis; a plurality of centering devices configured to substantially align the axis of the tubular wall with a longitudinal axis of the pipeline; a first and a second annular wall arranged respectively at the opposite ends of the tubular wall; and a first and a second plurality of vent openings arranged along the tubular wall respectively in proximity to the first and second annular wall; and at least one feeding port configured to supply polymer material into the closed compartment.

It should be appreciated that based on the configuration of the die, it is possible to achieve a gradual and progressive filling of the closed compartment and let out the air from the closed compartment in a relatively simple and relatively inexpensive manner.

In particular, each vent opening comprises a hole made in the tubular wall and an insert of porous material, which is configured to allow the air to pass and stop the flow of the polymer material. In this way, the air is rapidly let out of the die, while the polymer material is held inside the die.

In particular, the first and second vent openings are distributed, in particular uniformly distributed, along respective areas arranged in proximity to the first and second annular wall and between the first and second annular wall with reference to the designated axis. As such and based on this arrangement, the polymer material is arranged at the vent openings, almost at the end of the phase of injecting the polymer material.

In particular, each annular wall is made of an elastic material, in particular silicon and in particular with a hardness from 50 to 70 Shore A.

The elastic compliance of the annular wall enables the die to adapt relatively easily to any irregularities in the pipeline.

To this end, each annular wall comprises a base portion fixed to the tubular wall and an end portion configured to be deformed against the pipeline when the die is coupled to the pipeline.

In particular, the annular wall presents a cross-section comprising two sides converging from the base portion towards the end portion. This conformation facilitates the deformation of the end portion of the annular wall.

In particular, each annular wall presents a cross-section having a central opening to further assist the deformation of the annular wall and enable the air trapped inside the die to escape when the vent openings are no longer in operation.

In particular, the plurality of centering devices comprises first and second centering devices; the first and second annular wall being arranged between the first and second centering devices with reference to the designated axis. That is, the centering of the die is achieved at the opposite ends.

In particular, the centering devices comprise rollers rotatably supported by the tubular wall and configured to roll along the outer face of the pipeline. That is, the centering devices and the annular walls enable a relative movement between the pipeline and the die.

In particular, the feeding port is arranged between the first and the second annular walls with reference to the designated axis, in particular, the feeding port is equally spaced from the first and the second annular walls. This arrangement enables the die to be filled relatively quickly.

In particular, to facilitate the assembly of the die, the tubular wall comprises at least two sectors hinged to each other so as to be able to be closed about the pipeline.

Furthermore, said sectors each comprise a first and a second coupling face adapted to be coupled to a second and a first face of the other sector, said first and second coupling face being configured to achieve a shape coupling between the sectors adapted to prevent the mutual sliding of said sectors, in particular in a radial direction. In this way, the integrity of the tubular wall is maintained, which, for reasons of assembly, must be made in at least two pieces.

In particular, the first coupling face presents a groove parallel to the designated axis, while the second coupling face presents a relief parallel to the designated axis, substantially complementary to the groove.

Additional features and advantages are described in, and will be apparent from the following Detailed Description and the figures.

BRIEF DESCRIPTION OF THE FIGURES

Further characteristics and advantages of the present disclosure will become clear from the following description of a non-limiting embodiment, with reference to the figures in the appended drawings, wherein.

DETAILED DESCRIPTION

Figure 1:
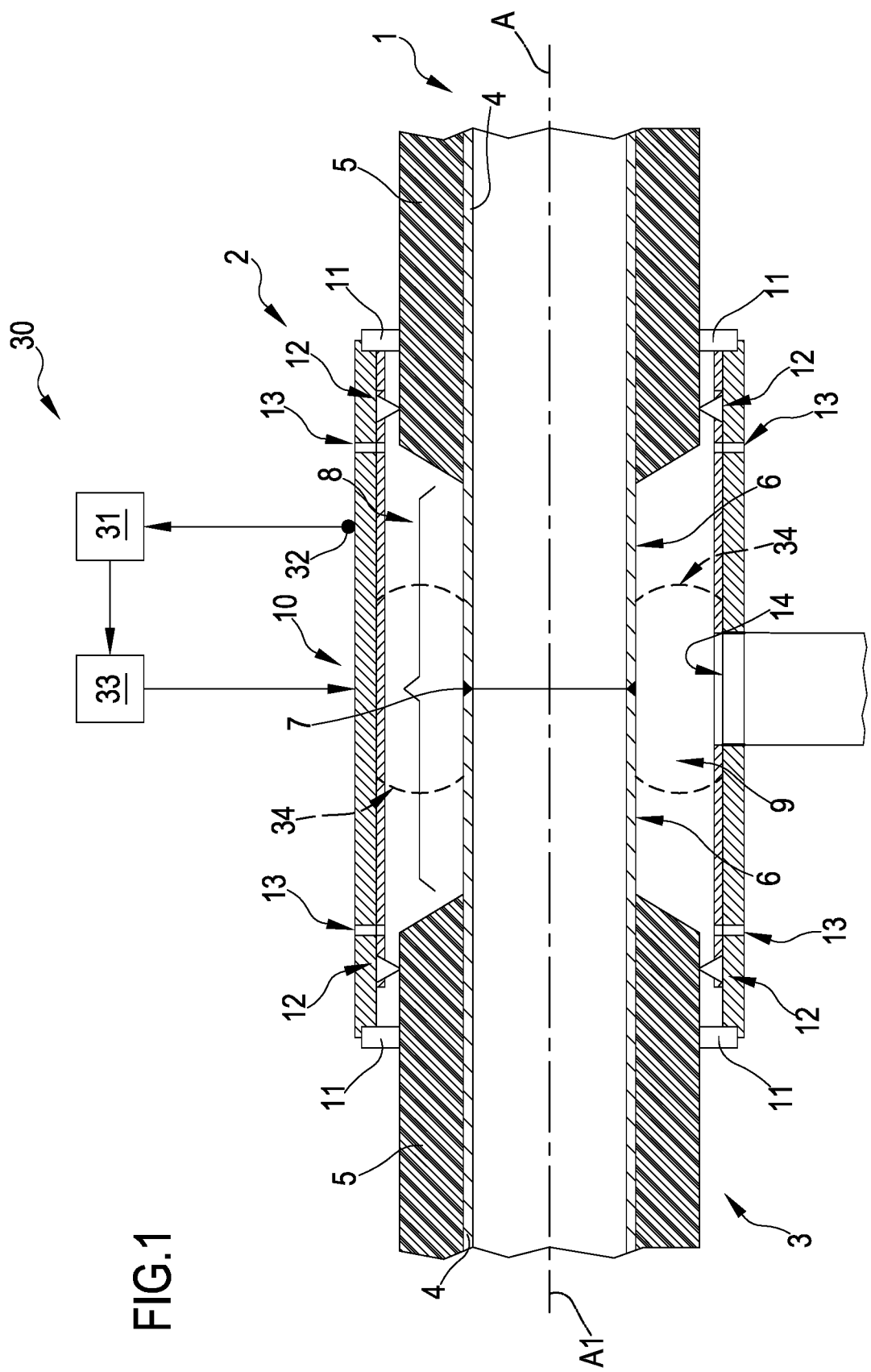
FIG. 1 is a section view, with parts removed for clarity, of a die for casting junctions of a coating of a pipeline.

A section of pipeline 1 is globally represented, with reference to FIG. 1, extending along a longitudinal axis A and about which a die 2 is arranged. In this case, the section of pipeline 1 illustrated shows two sections of pipe 3 joined to each other by welding. Each section of pipe 3 comprises a steel cylinder 4; and a coating 5 of polymer material, which serves to protect and insulate the steel cylinder 4, and can be made in one single layer or in a plurality of layers. The opposite free ends of each section of pipe 3 are without the coating 5 to enable the steel cylinders 4 to be welded to each other and define a welding seam 7. The section of pipeline 1, which extends axially between two end edges of the existing coatings 5, is a tubular joint portion 8.

Figure 2:
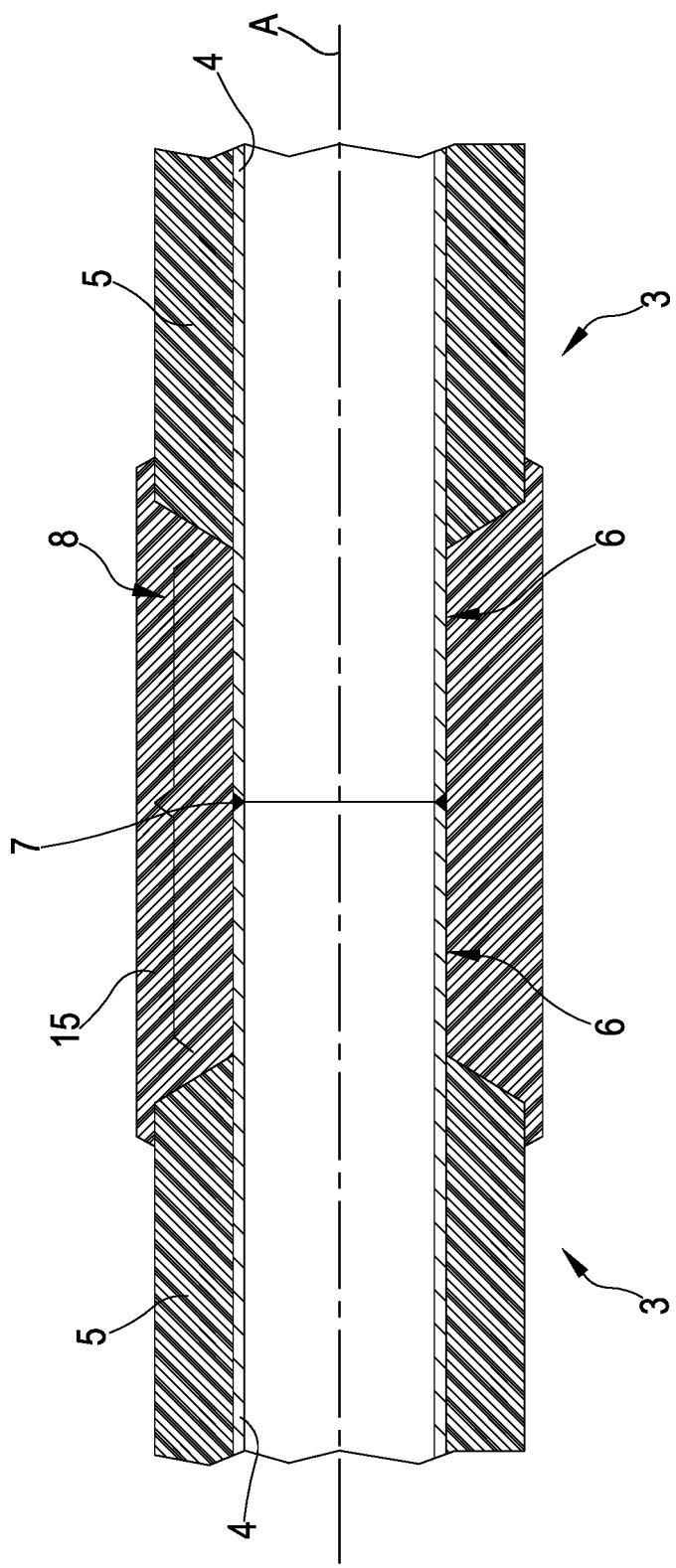
FIG. 2 is a section view, with parts removed for clarity, of a pipeline provided with a junction cast by the die in FIG. 1.

The die 2 is coupled to the pipeline 1 at the coatings 5 so as to define, in use, a closed compartment 9 at the tubular joint portion 8. The die 2 comprises a tubular wall 10, which extends along a designated or given axis A1; a plurality of centering devices 11 configured to substantially align the axis A1 with the longitudinal axis A of the pipeline 1; a first and a second annular wall 12 arranged respectively at the opposite ends of the tubular wall 10; and a first and a second plurality of vent openings 13 arranged along the tubular wall 10, at the first and second annular walls 12, respectively; and at least one feeding port 14 made of polymer material in the closed compartment 9 defined by the die 2 and by the tubular joint portion 8. In greater detail, the closed compartment 9 also extends partly at the opposite ends of the coatings 5 so as to enable welding to be made between the injected polymer material and the coatings 5, and it is delimited by opposite bands from the annular walls 12. That is, after hardening, the injected polymer material forms a protective sleeve 15, which is securely connected to the tubular joint portion 8 and to the pre-existing coatings 5, better illustrated in FIG. 2.

Figure 3:
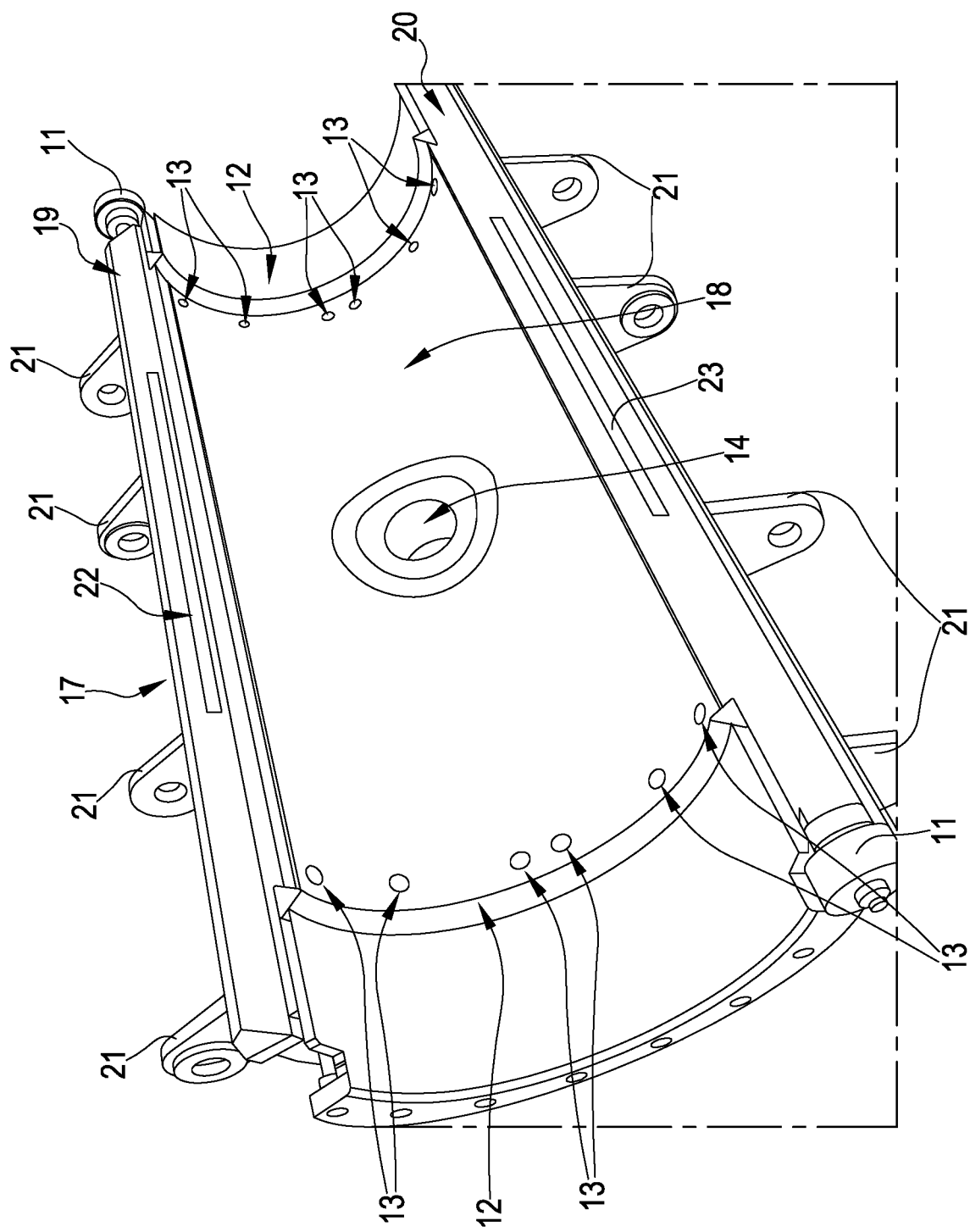
FIG. 3 is a perspective view, with parts removed for clarity, of the die in FIG. 1.

With reference to FIG. 3, the tubular wall 10 comprises at least two cylindrical sectors 16 hinged to each other so as to be able to be closed about the pipeline 1. More precisely, only one sector 16 is illustrated in FIG. 3, and it is understood that the sector 16 (which is not illustrated) is substantially complementary to the sector 16 shown, without the feeding port 14, which is made in only one of the sectors 16. Each sector 16 presents an outer face 17; an inner face 18; and two coupling faces 19 and 20 adjacent to the outer face 17 and to the inner face 18.

Each sector 16 comprises gripping elements 21 arranged along the outer face 17, which serve to connect the sector 16 to sector movement and control devices (not shown in the Figures).

The coupling faces 19 and 20 of a sector 16 are shaped so as to achieve respective shape couplings with the coupling faces 20 and 19 of the other sector 16 to prevent the mutual sliding of the sectors 16, in particular in a radial direction.

The coupling face 19 presents a groove 22 parallel to the axis A1, while the coupling face 20 presents a relief 23 parallel to the axis A1, substantially complementary to the groove 22.

In use, when the sectors 16 are mutually coupled, the reliefs 23 engage the grooves 22 preventing radial and axial slidings between the sectors 16, also when the polymer material injection pressures are relatively extremely high.

The centering devices 11 are positioned at the opposite distal ends of the die 2 (FIG. 1) and substantially comprise rollers, which are rotatably mounted onto the die 2, enabling a relative movement between the die 2 and the pipeline 1. In particular, the centering devices 11, in other words, the rollers, are arranged two by two, diametrically opposite.

Figure 4:
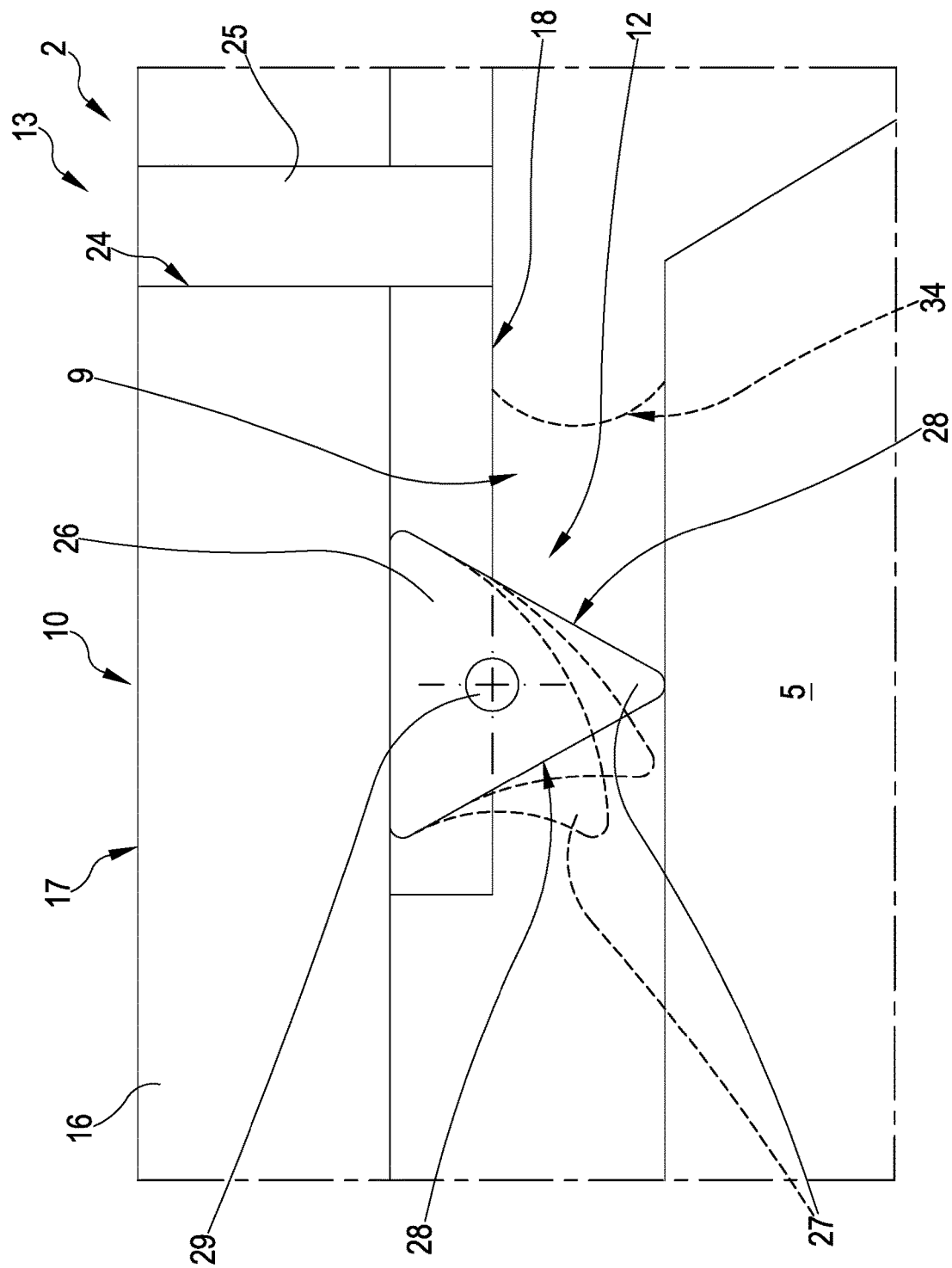
FIG. 4 is a section view, with parts removed for clarity, and on an enlarged scale, of a detail of the die in FIG. 1.

With reference to FIGS. 1 and 4, each vent opening 13 is housed in a through hole 24 made in the tubular wall 10 and comprises an insert 25 of porous material, which is configured to enable the air to pass and stop the flow of the polymer material. The inserts 25 of porous material can be of the type produced by the Company COMAT SRL, known by the trade name of Valvole Aria Van.

The vent devices 13 are distributed, in particular uniformly distributed, along respective annular areas arranged at the annular walls 12 and between the two annular walls 12 with reference to the axis A1.

With reference to FIG. 3, each annular wall 12 is made up of two sections, only one of which is illustrated in FIG. 3, complementary to each other to form a ring of elastic material, in particular silicon and, in particular, with a hardness from 50 to 70 Shore A.

With reference to FIG. 4, each annular wall 12 extends in a radial direction from the tubular wall 10 towards the axis A1 and plays mainly a sealing role, axially delimiting the closed compartment 9 by opposite bands. Each annular wall 12 comprises a base portion 26 drowned in the tubular wall 10 and an end portion 27 configured to be deformed when it comes into contact with the pipeline 1, in this case when it comes into contact with the coating 5, when the die 2 is anchored to the pipeline 1.

In particular, the annular wall 12 presents a cross-section comprising two sides 28 converging from the base portion 26 towards the end portion 27.

Furthermore, the annular wall 12 presents a cross-section having a central opening 29, which gives the annular wall 12 greater elasticity in an axial direction.

With reference to FIG. 1, the temperature of the die 2 is controlled by a system 30 comprising a control unit 31 and a plurality of sensors 32, only one of which is shown in FIG. 1, and a temperature control device 33, which is able to circulate a liquid at a controlled, varying temperature, according to the polymer material injection phase, inside cavities (not shown).

With reference to FIG. 1, in use, the polymer material is injected into the closed compartment 9 of the die 2 through the feeding port 14, forming two fronts 34, which move gradually into the closed compartment 9, in opposite and parallel directions to the longitudinal axis A, towards the opposite ends of the die 2 and partly in a circumferential direction. In this phase, the air in the closed compartment 9 is expelled through the vent openings 13. The gradual advancing of the fronts 34 towards the opposite ends of the die 2 causes the polymer material to arrange itself at the vent openings 13 as shown, for example, in FIG. 4, thus stopping the air still trapped inside the closed compartment 9 from escaping through the vent openings 13.

With reference to FIG. 4, the air trapped between the front 34 of the polymer material, the pre-existing coating 5, the tubular wall 10 and the annular part 12 is expelled thanks to the deformation of the annular wall 12 determined by the increase in pressure of the air and by the closure of the vent openings 13. Consequently, the annular wall 12 can also act, if necessary, as a vent for the air trapped inside the closed compartment 9.

The present disclosure clearly includes further variations, which are not described in detail, without going beyond the protective scope of the following claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A die comprising:
   a tubular wall which extends about an axis;
   a plurality of centering devices configured to align the tubular wall such that the axis of the tubular wall with a longitudinal axis of a pipeline;
   a first annular wall arranged at one end of the tubular wall;
   a first plurality of vent openings arranged along the tubular wall within a first designated distance of the first annular wall, wherein each of the first plurality of vent openings comprises:
      a hole defined by the tubular wall, and
      an insert of porous material which is configured to enable air to pass through the hole and stop a flow of polymer material;
   a second annular wall arranged at an opposite end of the tubular wall;
   a second plurality of vent openings arranged along the tubular wall within a second designated distance of the second annular wall, wherein each of the second plurality of vent openings comprises:
      a hole defined by the tubular wall, and
      an insert of porous material which is configured to enable air to pass through the hole and stop a flow of polymer material; and
   at least one feeding port configured to supply polymer material into an annular-shaped closed compartment formed about a tubular joint portion of the pipeline when the die is coupled to the pipeline.

2. The die of claim 1, wherein the first plurality of vent openings and the second plurality of vent openings are uniformly distributed along respective areas arranged between the first annular wall and the second annular wall relative to the axis of the tubular wall.

3. The die of claim 1, wherein the first annular wall and the second annular wall are each made of a silicon elastic material with a hardness from 50 Shore A to 70 Shore A.

4. The die of claim 1, wherein the tubular wall comprises at least two sectors hinged to each other and configured to be closed about the pipeline.

5. The die of claim 4, wherein the two sectors each comprise a first coupling face and a second coupling face configured to shape couple to the other sector to prevent mutual sliding of said sectors in a radial direction.

6. The die of claim 5, wherein the first coupling face defines a groove parallel to the axis of the tubular wall and the second coupling face defines a relief parallel to the axis of the tubular wall and complementary to the groove.

7. A die comprising:
   a tubular wall which extends about an axis;
   a plurality of centering devices configured to align the tubular wall such that the axis of the tubular wall with a longitudinal axis of a pipeline;
   a first annular wall made of a silicon elastic material with a hardness from 50 Shore A to 70 Shore A and arranged at one end of the tubular wall, wherein the first annular wall comprises a base portion fixed to the tubular wall and an end portion configured to be deformed when the end portion comes into contact with the pipeline when the die is coupled to the pipeline;
   a first plurality of vent openings arranged along the tubular wall within a first designated distance of the first annular wall;
   a second annular wall made of a silicon elastic material with a hardness from 50 Shore A to 70 Shore A and arranged at an opposite end of the tubular wall, wherein the second annular wall comprises a base portion fixed to the tubular wall and an end portion configured to be deformed when the end portion comes into contact with the pipeline when the die is coupled to the pipeline;
   a second plurality of vent openings arranged along the tubular wall within a second designated distance of the second annular wall; and
   at least one feeding port configured to supply polymer material into an annular-shaped closed compartment formed about a tubular joint portion of the pipeline when the die is coupled to the pipeline.

8. The die of claim 7, wherein the first plurality of vent openings and the second plurality of vent openings are uniformly distributed along respective areas arranged between the first annular wall and the second annular wall relative to the axis of the tubular wall.

9. The die of claim 7, wherein the tubular wall comprises at least two sectors hinged to each other and configured to be closed about the pipeline.

10. The die of claim 9, wherein the two sectors each comprise a first coupling face and a second coupling face configured to shape couple to the other sector to prevent mutual sliding of said sectors in a radial direction.

11. The die of claim 10, wherein the first coupling face defines a groove parallel to the axis of the tubular wall and the second coupling face defines a relief parallel to the axis of the tubular wall and complementary to the groove.

12. A die comprising:
    a tubular wall which extends about an axis;
    a plurality of centering devices configured to align the tubular wall such that the axis of the tubular wall with a longitudinal axis of a pipeline, wherein the plurality of centering devices comprise a plurality of rollers rotatably supported by the tubular wall and configured to roll along an outer face of the pipeline;
    a first annular wall arranged at one end of the tubular wall;
    a first plurality of vent openings arranged along the tubular wall within a first designated distance of the first annular wall;
    a second annular wall arranged at an opposite end of the tubular wall;
    a second plurality of vent openings arranged along the tubular wall within a second designated distance of the second annular wall; and
    at least one feeding port configured to supply polymer material into an annular-shaped closed compartment formed about a tubular joint portion of the pipeline when the die is coupled to the pipeline.

13. The die of claim 12, wherein the first plurality of vent openings and the second plurality of vent openings are uniformly distributed along respective areas arranged between the first annular wall and the second annular wall relative to the axis of the tubular wall.

14. The die of claim 12, wherein the first annular wall and the second annular wall are each made of a silicon elastic material with a hardness from 50 Shore A to 70 Shore A.

15. The die of claim 12, wherein the tubular wall comprises at least two sectors hinged to each other and configured to be closed about the pipeline.

16. The die of claim 15, wherein the two sectors each comprise a first coupling face and a second coupling face configured to shape couple to the other sector to prevent mutual sliding of said sectors in a radial direction.

17. The die of claim 16, wherein the first coupling face defines a groove parallel to the axis of the tubular wall and the second coupling face defines a relief parallel to the axis of the tubular wall and complementary to the groove.

18. A die comprising:
a tubular wall which extends about an axis;
a plurality of centering devices configured to align the tubular wall such that the axis of the tubular wall with a longitudinal axis of a pipeline;
a first annular wall arranged at one end of the tubular wall;
a first plurality of vent openings arranged along the tubular wall within a first designated distance of the first annular wall;
a second annular wall arranged at an opposite end of the tubular wall;
a second plurality of vent openings arranged along the tubular wall within a second designated distance of the second annular wall; and
at least one feeding port configured to supply polymer material into an annular-shaped closed compartment formed about a tubular joint portion of the pipeline when the die is coupled to the pipeline, wherein the at least one feeding port is arranged between the first annular wall and the second annular wall relative to the axis of the tubular wall.

19. The die of claim 18, wherein the first plurality of vent openings and the second plurality of vent openings are uniformly distributed along respective areas arranged between the first annular wall and the second annular wall relative to the axis of the tubular wall.

20. The die of claim 18, wherein the first annular wall and the second annular wall are each made of a silicon elastic material with a hardness from 50 Shore A to 70 Shore A.

21. The die of claim 18, wherein the tubular wall comprises at least two sectors hinged to each other and configured to be closed about the pipeline.

22. The die of claim 21, wherein the two sectors each comprise a first coupling face and a second coupling face configured to shape couple to the other sector to prevent mutual sliding of said sectors in a radial direction.

23. The die of claim 22, wherein the first coupling face defines a groove parallel to the axis of the tubular wall and the second coupling face defines a relief parallel to the axis of the tubular wall and complementary to the groove.

* * * * *